United States Patent

Denovan et al.

[15] 3,675,691
[45] July 11, 1972

[54] TREE HARVESTING APPARATUS

[72] Inventors: John J. Denovan; John Kurelek, both of Brantford, Ontario, Canada

[73] Assignee: Koehring-Waterous, Ltd., Brantford, Ontario, Canada

[22] Filed: Sept. 3, 1969

[21] Appl. No.: 854,971

[52] U.S. Cl. .................................... 144/3 D, 144/34 E
[51] Int. Cl. ............................................. A01g 23/02
[58] Field of Search ............. 144/2 Z, 3 D, 34 R, 34 E, 208 R, 144/242 R, 309 AC, 246 C, 246 F

[56] References Cited

UNITED STATES PATENTS

| | | |
|---|---|---|
| 3,140,736 | 7/1964 | Propst .................................. 144/3 D |
| 3,443,611 | 5/1969 | Jorgensen ......................... 144/309 AC |
| 3,516,462 | 6/1970 | Martinson et al. ..................... 144/3 D |

*Primary Examiner*—Gerald A. Dost
*Attorney*—William A. Denny and Wenzel Zierold

[57] ABSTRACT

A telescopic tower is mounted on a mobile chassis and carries equipment for producing logs from a tree that has been severed at its base from the ground and transferred to a raised position adjacent the top of the contracted tower. An upstroke of a reciprocable upper part of the tower delimbs the butt end of the raised tree to desired log length, and a downstroke lowers the tree a corresponding distance. After a log has been cut from the lowered tree, the operating cycle is repeated as needed to process the usable remainder of the tree into logs. The tower is leanable to one side to let the slash fall to the ground rather than on the chassis of the apparatus.

4 Claims, 9 Drawing Figures

INVENTORS
JOHN J. DENOVAN
AND JOHN KURELEK
BY W. O. Denny
ATTORNEY.

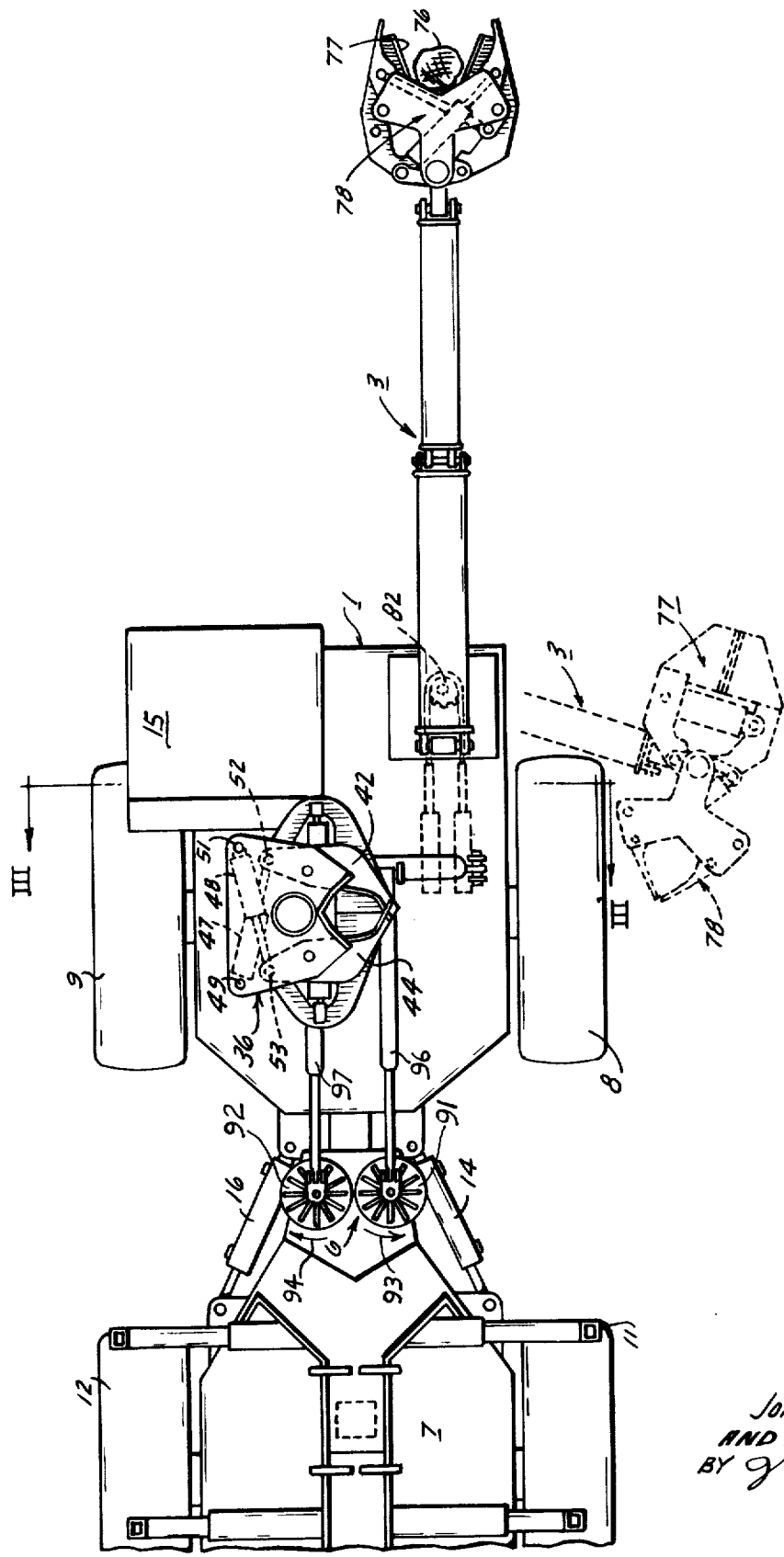

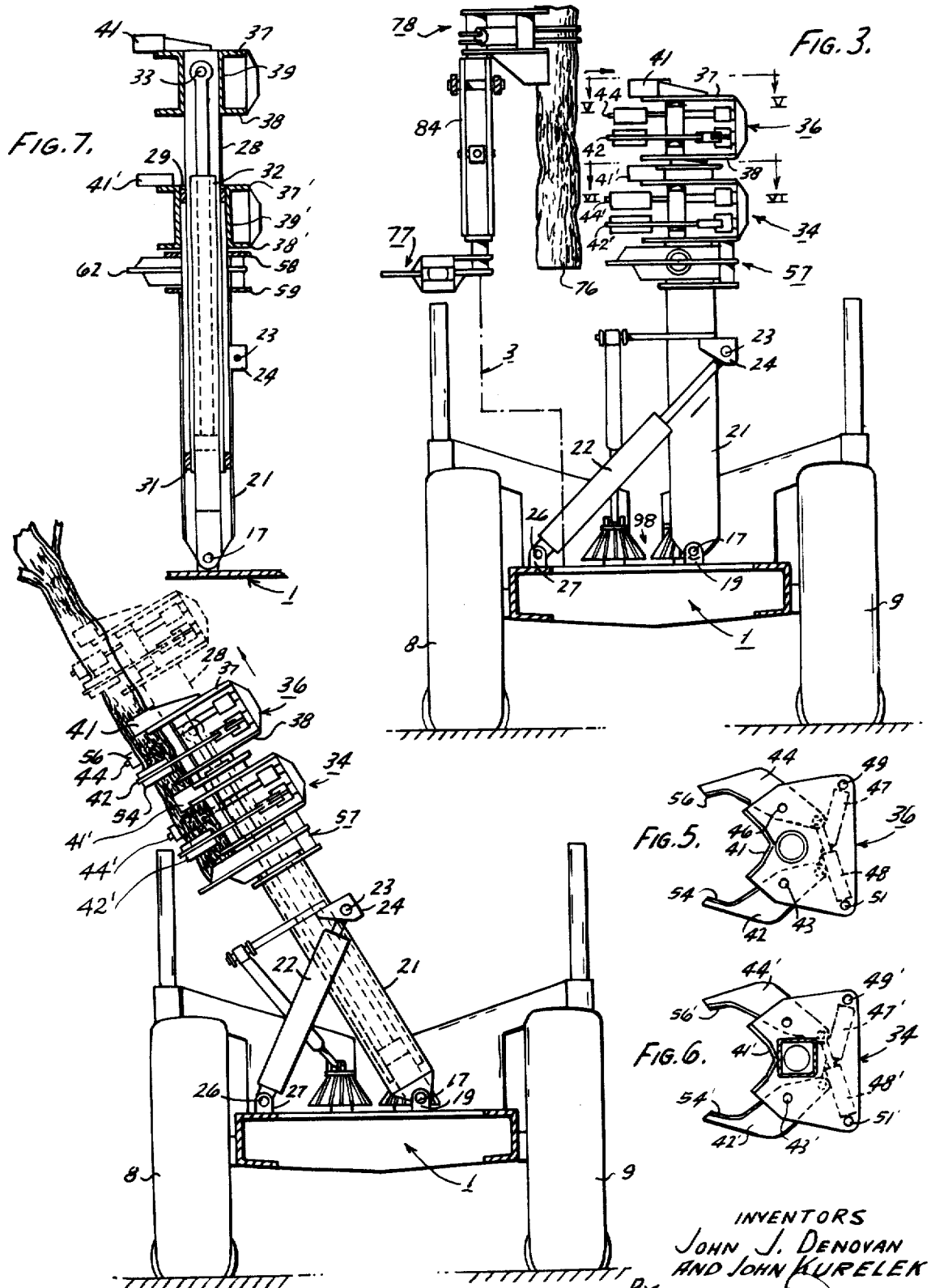

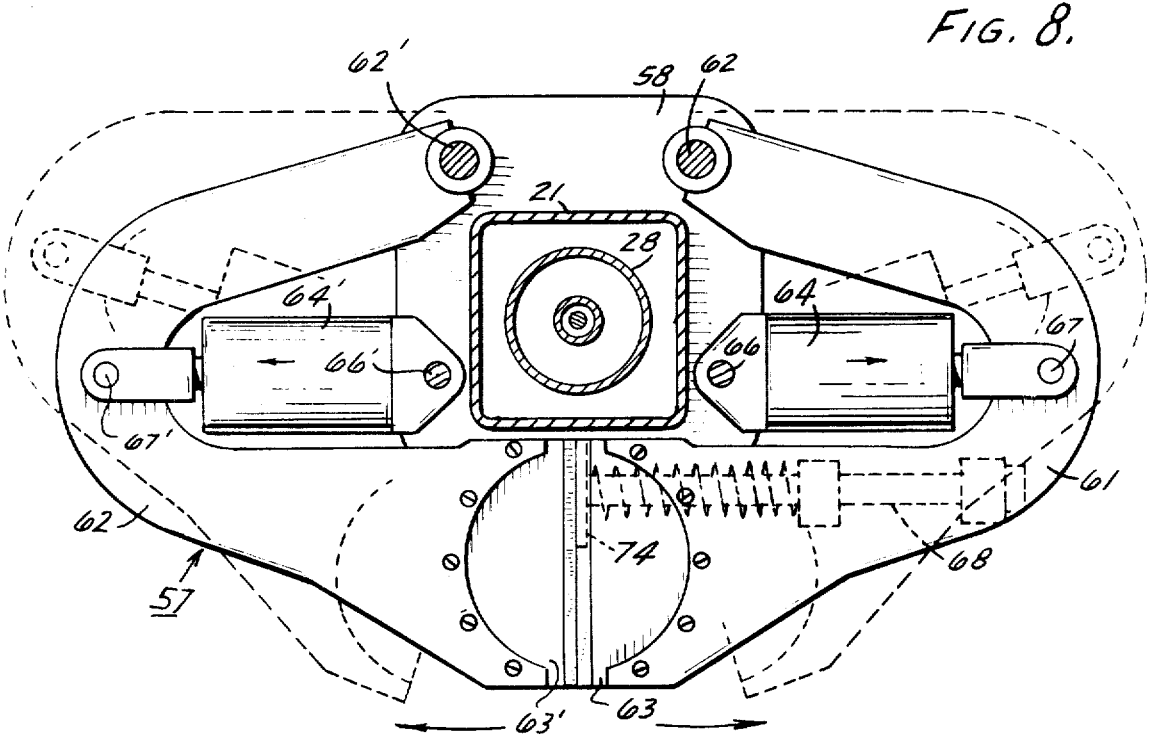

TREE HARVESTING APPARATUS

The invention relates to the harvesting of trees and it has to do more particularly with the slashing of limbs from tree trunks and the cutting of logs in the stump area.

A procedure for harvesting trees has heretofore been proposed which involves the steps of severing a standing tree at its base from the ground while holding it against falling from its growth position; moving the severed tree lengthwise upward and horizontally sidewise from its growth position into an elevated position; lowering the tree lengthwise from the elevated position through a delimbing zone; and cutting logs from trunk portions of the tree which have been passed through the delimbing zone.

Generally, it is an object of the present invention to provide an improved apparatus for harvesting trees in accordance with the above outlined procedure.

More specifically it is an object of the invention to provide an improved tree harvesting apparatus of the mentioned character which will be operable efficiently and reliably to produce logs by lowering a raised tree step by step through a delimbing zone and cutting delimbed trunk portions of the tree into logs of desired length such as the usual 8 foot length for pulp wood logs.

A further object of the invention is to provide a tree harvesting apparatus of the mentioned character wherein the delimbing and log cutting mechanisms are so arranged that a number of trees may be processed, one after the other, without the apparatus becoming loaded with slash.

A further object of the invention is to provide a tree harvesting apparatus of the mentioned character which is relatively simple and compact in construction and which may be manufactured at relatively low costs.

With these objects in view the invention contemplates to provide a telescopic tower which has a lower part mounted on a mobile chassis, and a reciprocable part which is extendable upwardly from and retractable downwardly toward the lower tower part. At its upper end the lower tower part has a clamping mechanism for grasping the trunk of an elevated upright tree, and the reciprocable tower part has a delimbing knife mechanism which by an upstroke of the reciprocable tower part delimbs a desired length of the grasped tree. Also connected with the reciprocable tower part is a gripping mechanism which, after release of the clamping mechanism on the lower tower part, lowers the tree by a retracting stroke of the reciprocable tower part. A shear mechanism on the lower tower part cuts a delimbed trunk portion of desired log length from the lowered tree.

A further object of the invention is to provide a mobile tree harvesting apparatus incorporating a telescopic tower and associated processing equipment as outlined above, and which further incorporates a log tipping device which will automatically cause a cut log to fall away from the tower and toward the rear of the chassis.

These and other objects and advantages are attained by the present invention, various novel features of which will be apparent from the following description of a preferred embodiment of the invention, and will be pointed out by the appended claims.

In the accompanying drawings,

FIG. 2 is a top view of the apparatus shown in FIG. 1 and illustrating different operating positions of a tree gathering boom in full lines and broken lines, respectively.

FIG. 3 is an end view of the apparatus shown in FIG. 1 with some of its parts broken away on line III—III of FIG. 2 and others moved to a transitional position of adjustment;

FIG. 4 is a view similar to FIG. 3 showing the processing tower of the apparatus in a leaned operating position;

FIG. 5 is a plan view on line V—V of FIG. 3;

FIG. 6 is a sectional plan view on line VI—VI of FIG. 3;

FIG. 7 is a sectional detail view of part of the apparatus shown in FIG. 3;

FIG. 8 is an enlarged sectional plan view on line VIII—VIII of FIG. 1; and

FIG. 9 is a side view of FIG. 8.

Figure 1:
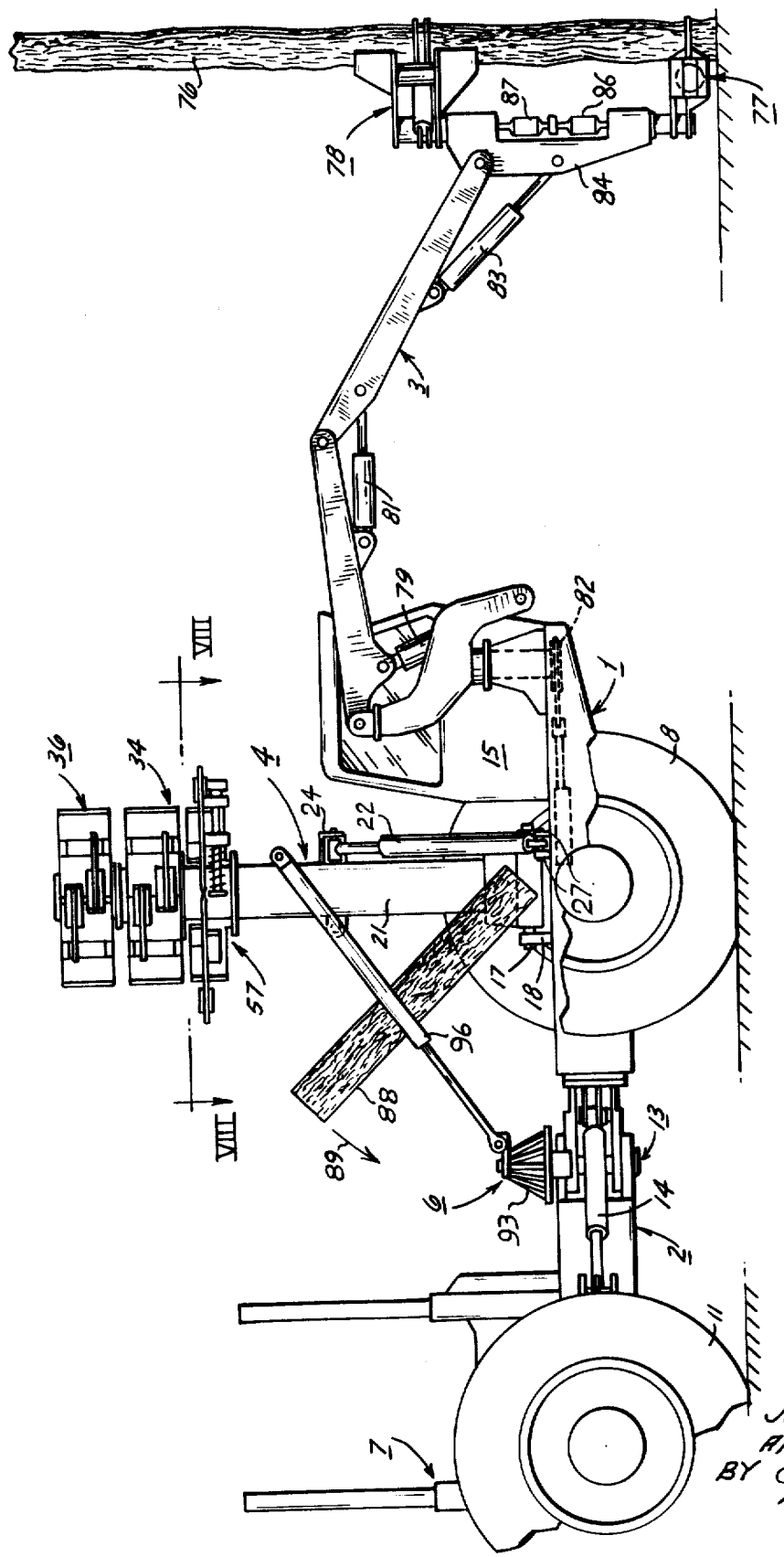
FIG. 1 is a side elevation of a tree harvesting apparatus embodying the invention.

The principal components of the tree harvesting apparatus shown in the drawings are an articulated vehicle chassis comprising a front unit 1 and a rear unit 2; a tree gathering boom assembly 3 and a tree processing tower 4 on the front unit 1; and a log transfer mechanism 6 and log storage assembly 7 on the rear unit 2. Supporting wheels 8 and 9 of the front unit, and similar supporting wheels 11 and 12 of the rear unit are power driven by conventional mechanism, not shown; and a center joint 13 between the front and rear units provides for horizontal angling and lateral tilting of the two units about vertical and horizontal pivot axes, respectively, as is customary in off-the-road, heavy duty vehicles. Steering rams 14 and 16 are connected between the front and rear units, as best shown in FIG. 2. An operator's cab 15 is mounted on the forward left corner of the front vehicle unit 1.

The part of the apparatus which is of principal interest in connection with the present invention is the tree processing tower 4. As shown in FIGS. 1 and 2, the tower is mounted midships on the front vehicle unit 1 between the wheels 8 and 9. A horizontal pivot pin 17, which extends lengthwise of the front vehicle unit, is mounted in a bracket 18 in rear of the tower, and in a corresponding bracket 19 (FIG. 3) at the front side of the tower. Tiltably supported on the pin 17 between the brackets 18 and 19 is a tubular column member 21 which forms the lower part of the tower. As best shown in FIGS. 3 and 4, the column member 21 is retained in pivotally adjusted positions on the pin 17 by adjustable bracing means in the form of a double acting hydraulic ram 22 which is operatively interposed between the chassis of the front vehicle unit and the column member 21. A pivot pin 23 connects the piston rod of the ram 22 with a bracket 24 which is secured to the column member 21 about midway between its lower and upper ends, and a pivot pin 26 connects the barrel end of the ram with a bracket 27 at the chassis side toward which the tower may be leaned by contraction of the ram 22.

As best shown in FIG. 7, the tubular column member 21 telescopically mounts another tubular member 28 which forms a reciprocable upper part of the processing tower. The lower column member 21 is made of square tubing (FIG. 8) and the reciprocable column member 28 is cylindrical and guided within the lower column member by centering devices 29 and 31 (FIG. 7) which are connected, respectively, to the upper end of the lower column member 21 and to the lower end of the upper column member 28.

A long, double acting hydraulic ram 32 for extending and contracting the telescopic tower structure is enclosed within the column members 21 and 28, the barrel end of the ram being connected to the tower pivot pin 17, and the piston rod of the ram being connected to the upper end of the reciprocable column member 28 by a wrist pin 33.

The lower column member 21 is equipped at its upper end with a selectively contractable and expandable tree holding mechanism 34, and the reciprocable column member 28 is equipped at its upper end with a selectively contractable and expandable tree gripping mechanism 36. FIGS. 2 and 5 show the tree gripping mechanism 36 in contracted and expanded conditions, respectively; and FIG. 6 shows the tree holding mechanism 34 in an expanded condition corresponding to the expanded condition of the tree gripping mechanism 36.

A frame structure of the tree gripping mechanism 36 comprises top and bottom plates 37, 38 (FIG. 7) and a tubular spacer 39 therebetween which surrounds the upper end of the reciprocable column member 28 and is rigidly secured thereto, as by welding. At the side of the tower where a tree may be positioned for processing as shown in FIG. 4, the frame plates 37, 38 are recessed, and an upstanding, generally arcuate face plate 41 (FIG. 5) is secured to the top plate 37 to form a tree seat. In the space between the plates 37, 38 a tree clasping arm 42 (FIG. 5) is pivoted intermediate its ends on a pin 43 at the forward side of the tower, and a corresponding tree clasping arm 44 is pivoted at the rear side of the tower on a pin 46 between the plates 37 and 38. Hydraulic actuating rams 47, 48 for the clasping arms 42 and 44 are mounted between the plates 37, 38 on pivot pins 49, 51 respectively; the piston rod of the ram 47 (FIG. 2) being pivotally connected at 52 with the inner end of the arm 42, and the piston rod of the ram 48 being pivotally connected at 53 with the inner end of the arm 44. The clasping arm 42 has an upstanding, generally arcuate pressure plate 54 at its free end outside of the frame plates 37, 38; and the clasping arm 44 has a similar pressure plate 56. The upper ends of the pressure plates 54, 56, as well as the upper end of the face plate 41, are sharpened so that during an upstroke of the reciprocable column member 28, as indicated by broken lines in FIG. 4 and as will be discussed more fully hereinbelow, the plates 41, 54 and 56 may serve conjointly as limb cutting knives.

The tree holding mechanism 34 at the upper end of lower column member 21 is substantially a duplicate of the tree gripping mechanism 36. The explanation hereinbefore with respect to the construction and operation of the tree gripping mechanism analogously apply to the tree holding mechanism, parts of the tree holding mechanism which correspond to parts of the tree gripping mechanism being designated by the same but primed reference numerals as those of the tree gripping mechanism. The principal function of the plates 41', 54' and 56' of the tree holding mechanism 34 is to clasp a tree trunk and retain it on the lower column member 21 during an upstroke of the gripping mechanism 36. Like the plates 41, 54 and 56 of the tree gripping mechanism 36, the plates 41', 54' and 56' of the tree holding mechanism 34 may have their upper edges sharpened so that they will become effective to cut off stubs and additional bark when the tree is lowered by a down stroke of the closed gripping mechanism 36, as will be explained more fully hereinbelow.

In addition to the tree holding mechanism 34, the lower column member 21 of the tree processing tower mounts a log shear mechanism generally designated by the reference numeral 57. Referring to FIGS. 8 and 9, an upper mounting plate 58 and a lower mounting plate 59 for a pair of shear arms 61 and 62 are rigidly secured, as by welding, to the square tubular column member 21 immediately below the lower frame plate 38' (FIG. 7) of the tree holding assembly 34. The shear arm 61 is arched around the forward side of the processing tower and is pivotally mounted on a pin 62 between the plates 58, 59 for back and forth swinging movement transversely of the column member 21. The free end of the arm 61 carries a shear blade 63 at the processing side of the tower and a double acting hydraulic actuating ram 64 for the shear arm 61 is pivoted at its barrel end on a pin 66 between the mounting plates 58, 59. The piston rod of the ram 64 has a pivot connection 67 with the bight portion of the shear arm 61.

The shear arm 62 is an opposite hand duplicate of the shear arm 61. It arches around the rear side of the processing tower and is mounted on a pin 62' for back and forth swinging movement transversely of the column member 21 in the same plane as the arm 61. A cutting blade 63' on the arm 62 matches the cutting blade 63, and an actuating ram 64' corresponding to the ram 64 is connected by pivot pins 66' and 67' to the column member 21 and arm 62, respectively. Expansion of the rams 64, 64' moves the arms 61, 62 from the shear closed position in which they are shown in full lines in FIG. 8 to the broken-line shear open position, and a cutting stroke of the log shear mechanism is effected by contraction of the rams 64, 64'.

Operatively associated with the log shear mechanism 57 is a log tipping device which, as indicated in broken lines in FIG. 1 and as will be discussed more fully hereinbelow, is operable to direct a log away from the lower column member 21 upon completion of a cutting stroke of the log shear mechanism. The log tipping device comprises a reciprocable thrust rod 68 (FIG. 9) which is slidably mounted in depending brackets 69 and 71 at the underside of the shear arm 61. A stop collar 72 at one end of the rod 68 is engageable with the bracket 71 to limit axial movement of the rod, in one direction, and a coil spring 73 reacting between the bracket 69 and an abutment plate 74 at the other end of the rod urges the rod into the limit position which is determined by engagement of the stop collar 72 with the bracket 71. The rod 68 is supported by the brackets 69, 71 in such angular relation to the shear arm 61 that upon completion of a cutting stroke of the log shear mechanism the thrust of the rod 68 under the action of the spring 73 is directed transversely of the lower column member 21 and generally toward the rear of the front vehicle unit 1.

FIG. 1 shows the apparatus in condition to start a tree processing cycle. The tree gathering boom assembly 3 is shown in engagement with a tree 76 which has been selected for processing into logs. A tree shear assembly 77 straddles the tree trunk near the ground, and a tree grappling mechanism 78 embraces the standing tree at a distance of several feet above the shear assembly 77. A closing stroke of the tree shear assembly 77 will sever the tree from the ground while it is held against falling from its growth position by the grappling mechanism 78. After the tree has been cut from the ground and while it is held in an upright position by the grappling mechanism 78 it may be raised and moved laterally to an elevated position adjacent the processing side of the tower 4 by extension of a boom lifting ram 79, contraction of a boom folding ram 81, actuation of a boom turning gear 82 and, if necessary, actuation of a tree tilting ram 83. A mounting head 84 for the tree shear assembly 77 and tree grappling mechanism 78 carries two vane type hydraulic motors 86 and 87 which are connected, respectively, with the tree shear assembly 77 and with the grappling mechanism 78. After the tree has been cut from the ground and while it is being transferred from its growth position to an elevated position adjacent the processing side of the tower 4, the shear assembly 77 may be swung out from under the butt end of the tree by the motor 86 in an anti-clockwise direction as viewed in FIG. 2, and the tree grappling mechanism 78 may be swung by the motor 87 clockwise into a tree delivering position as indicated in dotted lines in FIG. 2.

To prepare the processing tower 4 for the acceptance of a tree from the gathering boom assembly 3 the tower is adjusted to the vertical position in which it is shown in FIG. 3 by extension of the tilting ram 22; the reciprocable column member 28 is adjusted to its fully retracted position in which it is shown in FIGS. 1 and 3, by contraction of the tower extending ram 32; the tree holding mechanism 34 and the tree gripping mechanism 36 are adjusted to their expanded positions in which they are shown in FIGS. 5 and 6, by contraction of the actuating rams 47, 48 and 47', 48'; and the log shear mechanism 57 is adjusted to its shear open position in which it is shown in broken lines in FIG. 8.

FIG. 3 shows the lower end of the tree 76 moved opposite to the expanded tree holding and gripping mechanisms 34 and 36, the trunk of the tree extending substantially parallel to the axis of the vertically positioned tower, and the cut end face of the tree trunk being on a level somewhat below the level of the lower tree clasping arm 42'. Sidewise movement of the tree 76 from the position shown in FIG. 3 against the face plates 41 and 41' of the tree holding and gripping mechanisms 34, 36 may be effected by operation of the boom turning gear 82 (FIG. 2). While the grapple mechanism 78 holds the tree upright within the operating range of the clasping arms 42, 44 and 42', 44', the actuating rams 47' and 48' of the tree holding mechanism 34 may be expanded to firmly lock the lower end of the tree on the upper end of the lower column member 21. For that purpose considerable hydraulic pressure is admitted to the barrel ends of the rams 47' and 48'.

Also, while the tower is in its contracted, vertical position, and after a tree has been moved into the operating range of the tree holding and gripping mechanisms 34, 36 fluid pressure will be admitted to the barrel ends of the actuating rams 47 and 48 of the tree gripping mechanism 36. However, such fluid pressure will at this time be kept much lower than the fluid pressure admitted to the barrel ends of the actuating rams 47' and 48' of the tree holding mechanism 34. Consequently, the tree trunk will be encircled by the face plate 41 and pressure plates 54, 56 of the tree gripping mechanism, but very little radial pressure will be exerted upon it by the clasping arms 42 and 44.

After the tree has been transferred from the gathering boom assembly 3 to the processing tower, the grapple mechanism 78 is opened up and the gathering boom is returned to a position such as shown in FIG. 1 to start bringing another tree to the processing tower 4.

Delimbing of a tree which has been locked to the upper end of the column member 21 by the tree holding mechanism 34 is started by admission of pressure fluid to the barrel end of the tower extending ram 32 and a consequent upstroke of the reciprocable column member 28 from its fully retracted position in which it is shown in FIGS. 1 and 3. The throw of the ram 32 is approximately as long as the desired log length, which is normally eight feet for pulpwood logs.

At the same time at which the first up stroke of the column member 28 is started, leaning of the tower toward the inclined position in which it is shown in FIG. 4 is initiated by contraction of the tilting ram 22. The extending stroke of the ram 32 will be relatively fast and may be completed before the tower reaches its fully leaned position. Pulpwood trees usually have most of their live limbs and branches at a substantial distance from the ground, and the cutting edges of the plates 41, 54 and 56 of the contracted tree gripping mechanism will encounter relatively few limbs and branches during the first up stroke of the column member 28.

When the ram 32 has been fully extended and the tree gripping mechanism 36 has thereby been moved upward along the tree trunk to its maximum distance from the tree holding mechanism 34, the tree is unlocked from the lower column member 21 by reducing the fluid pressure in the barrel ends of the rams 47' and 48'. At the same time, the tree is locked to the upwardly extended column member 28 by substantially increasing the pressure of the fluid which is admitted to the barrel ends of the rams 47, 48 of the tree gripping mechanism 36. A subsequent contracting stroke of the ram 32 and the resulting return stroke of the reciprocable column member 28 will then move the tree a corresponding distance toward the bottom end of the lower column member 21. During such descent of the tree its trunk moves through the released tree holding mechanism 34 and through the open log shear mechanism 57, while it is kept substantially parallel to the leaned processing tower. When the return stroke of the reciprocable column member 28 is completed the bottom end of the tree has moved close to the deck of the front vehicle unit 1. At that time a cutting stroke of the log shear mechanism 57 is initiated by admission of pressure fluid to the gland ends of the shear actuating cylinders 64, 64'.

As the cutting edge of the shear blade 63 penetrates the trunk of the tree, the abutment plate 74 of the log tipping device bears against the outside of the trunk, and as the shear arm 61 continues to swing toward the shear arm 62 the thrust rod 68 is moved axially in the brackets 69, 71 and compresses the spring 73. When the blades 63, 63' have moved toward each other far enough so as to leave only a few connecting fibers between the upper and lower parts of the trunk, the spring loaded thrust rod 68 snaps back into the position in which it is shown in FIGS. 8 and 9. Such return movement of the thrust rod breaks the residual connecting fibers between the upper and lower trunk parts, and it directs the log to fall away from the lower column member 21 in a generally rearward direction as indicated in FIG. 1 by the log 88 and arrow 89.

The described tree delimbing and log cutting procedure may be repeated as often as necessary to process the remainder of the tree 76 which has been transferred from its growth position (FIG. 1) to the tower 4 (FIG. 3). The bulk of the limbs and branches are cut from the trunk of the tree while the tower is kept in the leaned position in which it is shown in FIG. 4. Consequently, the slash from the upper part of the tree will fall to the ground at the outer side of the wheel 8, and there will be no undue accumulation of slash on the front vehicle unit around the processing tower 4. Likewise, the top of the tree whose trunk is too slender for a pulpwood log, or an entire tree of insufficient trunk diameter, may be dropped to the ground at the outside of the wheel 8 by opening up the tree holding and gripping mechanisms 34, 36 while the tower is in the leaned position as shown in FIG. 4.

To prepare the apparatus for processing another tree which in the mean time has been cut from the ground and elevated by the gathering boom 3, the tower is returned to its vertical position and the tree holding, tree gripping and log shear mechanisms are adjusted to their tree accepting conditions. The herein described operating cycle may then be repeated for producing another series of logs.

The log transfer mechanism 6 on the rear vehicle unit 2 comprises two cleated cones 91 and 92 which are continuously rotated in opposite directions as indicated by the arrows 93 and 94 in FIG. 2. Telescopic log guides 96 and 97 extend from the lower tower column 21 to the apexes of the cones 93 and 94, respectively. The log tipping device 68–74 (FIG. 9) directs successive logs into the space between the guides 96, 97, and as they fall backward the logs are directed by the guides into the V-shaped gap 98 (FIG. 3) between the cones 91, 92. As each log hits the rotating cones 91, 92 it is impelled by the latter lengthwise into the log storage assembly 7 on the rear vehicle unit 2. Suitable provisions are made for accumulating successive logs in the storage assembly, but a detailed disclosure of this part of the apparatus is believed unnecessary for a full understanding of the present invention.

The various hydraulic components of the apparatus are powered by a hydraulic circuit, not shown, and controlled from the operator's cab 15.

The embodiments of the invention in which an exclusive property and privilege is claimed are defined as follows:

1. In a tree harvesting apparatus the combination of a mobile chassis, a tower structure comprising a lower column member supported on said chassis, and a reciprocable column member connected in upwardly extendable and downwardly retractable relation with said lower column member; selectively contractable and expandable tree holding means mounted on said lower column member adjacent its upper end; selectively contractable and expandable tree gripping means mounted on said reciprocable column member so that, in the retracted condition of the latter, said tree gripping means will overlie said tree holding means; delimbing knife means operatively associated with said tree gripping means for up and down movement therewith relative to said tree holding means; and log shear means mounted on said lower column member in underlying relation to said tree holding means; said log shear means comprising a pair of shear arms swingably mounted on said lower column member for swinging movement transversely thereof toward and away from each other; and a log tipping device operable to direct a log away from said lower column member upon completion of a cutting stroke of said shear means; said log tipping device comprising a thrust element movably mounted at the under side of one of said arms, and resilient means reacting between said one shear arm and said thrust element for urging the latter against the side of a log being cut by said shear means.

2. A tree harvesting apparatus as set forth in claim 1, wherein a reciprocable rod forming said thrust element is slidably mounted on said one shear arm in such angular relation thereto that its thrust, upon completion of a cutting stroke of said shear means, will be directed transversely of said lower column member and generally toward the rear of said chassis.

3. In a tree harvesting apparatus comprising:
a mobile vehicle;
tree felling means mounted adjacent one end of said vehicle, said tree felling means including a pivotable boom adapted to sever standing trees and move the same in a generally vertical condition to said vehicle;
log storage means on said vehicle for storing logs cut from trees felled by said tree felling means;
log transfer means on said vehicle for transferring logs to said log storage means;

the improvement comprising tree processing means for receiving generally vertical trees from said tree felling means, said processing means including a lower structure pivotally connected adjacent its lower end to said vehicle for swinging movement about a horizontal axis, said tower structure comprising:

a lower column member pivotally supported on said vehicle adjacent said log felling means;

a reciprocal column member connected in vertically movable relation with said lower column member;

selectively actuable tree holding means connected to said lower column member;

selectively actuable tree gripping means connected to reciprocable column member adapted to be vertically aligned with said tree holding means;

delimbing knife means operatively associated with said tree gripping means for movement therewith relative to said tree holding means through a delimbing zone;

log shear means operatively associated with said tree holding means for severing a portion of a tree below said tree holding means;

log tipping means for directing logs sheared by said shear means to said log transfer means; and motor means operatively connected between said vehicle and said tower structure for swinging said tower structure about said horizontal axis to move the tower portion adjacent said delimbing zone laterally away and remote from said vehicle whereby a severed tree is received by said tower structure in a generally vertical condition from said tree felling means after which said tower structure is adapted to be moved to an upwardly and outwardly vertically inclined position whereby branches removed from the tree during delimbing are free to fall to the ground at locations remote from said vehicle.

4. In a tree harvesting apparatus according to claim 3, wherein said vehicle comprises pivotally connected front and rear sections, said front section supporting said felling and processing means, said rear section supporting said log storage means; and said transfer means including log guiding means operatively connected between said sections.

* * * * *